(12) United States Patent
Henson et al.

(10) Patent No.: US 12,342,834 B2
(45) Date of Patent: Jul. 1, 2025

(54) COFFEE EXTRACTION PROCESS AND COFFEE PRODUCT

(71) Applicant: Koninklijke Douwe Egberts B.V., Utrecht (NL)

(72) Inventors: Sian Henson, Banbury (GB); Paul Ashworth, Banbury (GB); Simon Fox, Banbury (GB); Francisco Javier Silanes Kenny, Banbury (GB); Charles Edge, Banbury (GB); Eva Espino Ordóñez, Banbury (GB)

(73) Assignee: Koninklijke Douwe Egberts B.V., Utrecht (NL)

( * ) Notice: Subject to any disclaimer, the term of this patent is extended or adjusted under 35 U.S.C. 154(b) by 621 days.

(21) Appl. No.: 17/417,367

(22) PCT Filed: Dec. 20, 2019

(86) PCT No.: PCT/EP2019/086859
§ 371 (c)(1),
(2) Date: Jun. 22, 2021

(87) PCT Pub. No.: WO2020/136146
PCT Pub. Date: Jul. 2, 2020

(65) Prior Publication Data
US 2022/0071227 A1  Mar. 10, 2022

(30) Foreign Application Priority Data

Dec. 28, 2018  (GB) ...................................... 1821274

(51) Int. Cl.
*A23F 5/36* (2006.01)
*A23F 5/24* (2006.01)
(Continued)

(52) U.S. Cl.
CPC ................ *A23F 5/36* (2013.01); *A23F 5/243* (2013.01); *A23F 5/265* (2013.01); *A23F 5/28* (2013.01)

(58) Field of Classification Search
CPC .. A23F 5/36; A23F 5/243; A23F 5/265; A23F 5/28; A23F 5/08; A23F 5/24;
(Continued)

(56) References Cited

U.S. PATENT DOCUMENTS 2,350,903 A * 6/1944 Kellogg .................... A23F 5/40
426/321
2,947,634 A * 8/1960 Feldman ................... A23F 5/48
426/594

(Continued)

FOREIGN PATENT DOCUMENTS

CN    102613369         8/2012
DE    202013001163 U1 * 2/2014 ............... A23F 5/24
(Continued)

OTHER PUBLICATIONS

Office Action dated May 31, 2022, Russian Patent Application No. 2021118315 with English translation (7 pgs.).
(Continued)

*Primary Examiner* — Drew E Becker
*Assistant Examiner* — Luis Eugenio Diou Berdecia
(74) *Attorney, Agent, or Firm* — Fitch, Even, Tabin & Flannery LLP

(57) ABSTRACT

The present invention provides an instant coffee composition for forming a coffee beverage, wherein the composition comprises at least 6 wt % of an insoluble coffee sediment fraction, the insoluble coffee sediment fraction comprising, when analysed after acid hydrolysis, 1 wt % or less arabinose.

17 Claims, 3 Drawing Sheets

(51) Int. Cl.
  *A23F 5/26* (2006.01)
  *A23F 5/28* (2006.01)
(58) Field of Classification Search
  CPC .... A23F 5/26; A23F 5/04; A23F 5/262; A23F 5/32; A23F 5/34
  USPC ........................................................ 426/594
  See application file for complete search history.

(56) References Cited

U.S. PATENT DOCUMENTS

| | | | | |
|---|---|---|---|---|
| 3,361,571 | A * | 1/1968 | Nutting | A23F 5/226 426/387 |
| 3,361,572 | A * | 1/1968 | Nutting | A23F 5/265 426/434 |
| 3,451,823 | A * | 6/1969 | Mishkin | A23F 5/26 426/387 |
| 3,519,401 | A * | 7/1970 | Hellman | C13B 10/10 210/636 |
| 3,529,968 | A * | 9/1970 | Hair | A23F 5/26 426/434 |
| 3,652,292 | A * | 3/1972 | Bach | A23F 5/405 426/594 |
| 3,682,649 | A * | 8/1972 | Orozovich | A23F 5/14 426/432 |
| 3,762,930 | A * | 10/1973 | Mahlmann | A23N 12/08 426/594 |
| RE27,841 | E * | 12/1973 | Niven, Jr. et al. | A23F 5/28 426/385 |
| 3,862,347 | A * | 1/1975 | Thijssen | B01D 11/0284 426/434 |
| 3,903,312 | A * | 9/1975 | Clinton | A23F 5/48 426/594 |
| 4,100,306 | A * | 7/1978 | Gregg | A23F 5/265 426/432 |
| 4,281,023 | A | 7/1981 | Pyves | |
| 4,374,864 | A * | 2/1983 | Hufnagel | A23F 5/267 426/594 |
| 4,798,730 | A * | 1/1989 | Scoville | A23F 5/262 426/594 |
| 5,225,223 | A * | 7/1993 | Vitzthum | A23F 5/486 426/387 |
| 5,455,057 | A * | 10/1995 | Symbolik | A23F 5/32 426/453 |
| 5,897,903 | A * | 4/1999 | Gerhard-Rieben | A23F 5/262 426/433 |
| 5,997,929 | A * | 12/1999 | Heeb | B01D 11/0223 426/433 |
| 6,149,957 | A * | 11/2000 | Mandralis | A23F 5/486 426/387 |
| 6,165,536 | A * | 12/2000 | Heeb | A23F 3/18 426/594 |
| 7,470,443 | B2 * | 12/2008 | Ceriali | A23F 5/36 426/387 |
| 8,455,019 | B2 | 6/2013 | Milo | |
| 2001/0026821 | A1 * | 10/2001 | Scoville | G06K 19/0712 426/115 |
| 2001/0036497 | A1 * | 11/2001 | Zeller | A23F 5/40 426/434 |
| 2007/0231443 | A1 * | 10/2007 | Goto | A23F 5/28 426/594 |
| 2008/0113077 | A1 * | 5/2008 | Leloup | A23F 5/02 426/433 |
| 2012/0121791 | A1 * | 5/2012 | Echeverry Munetones | A23F 5/30 426/594 |
| 2013/0202748 | A1 * | 8/2013 | Fountain | A47J 31/44 426/115 |
| 2015/0296829 | A1 * | 10/2015 | Penner | A23F 5/46 426/507 |
| 2015/0327568 | A1 * | 11/2015 | Penner | A23F 5/32 426/507 |
| 2016/0198886 | A1 * | 7/2016 | Avins | A47J 31/44 99/302 R |
| 2016/0249635 | A1 * | 9/2016 | Spodsberg | A23F 5/36 426/45 |
| 2016/0295876 | A1 * | 10/2016 | Smith | A23F 5/405 |
| 2017/0002391 | A1 | 1/2017 | Lee | |
| 2017/0202236 | A1 * | 7/2017 | Pedersen | A23F 5/28 |
| 2017/0202237 | A1 * | 7/2017 | Sørensen | A23F 5/08 |
| 2018/0132503 | A1 * | 5/2018 | Watanabe | A23F 5/26 |

FOREIGN PATENT DOCUMENTS

| | | | |
|---|---|---|---|
| EP | 0363529 | 4/1990 | |
| EP | 0363529 B1 * | 3/1993 | A23F 5/26 |
| EP | 0826308 | 3/1998 | |
| EP | 0916267 | 5/1999 | |
| EP | 916267 A2 * | 5/1999 | A23F 3/18 |
| EP | 1795074 | 6/2007 | |
| GB | 1573755 A * | 8/1980 | A23F 5/265 |
| JP | 9252712 | 9/1997 | |
| JP | 1066507 | 3/1998 | |
| JP | 11221019 | 8/1999 | |
| JP | 2001017083 A * | 1/2001 | A23F 5/08 |
| JP | 2002511236 | 4/2002 | |
| JP | 3773524 B1 | 5/2006 | |
| JP | 2007129937 | 5/2007 | |
| JP | 2012525126 | 10/2012 | |
| JP | 2015533513 | 11/2015 | |
| JP | 201868122 | 5/2018 | |
| JP | 201893796 | 6/2018 | |
| KR | 1019830003884 A | 6/1983 | |
| KR | 19980019026 A | 6/1998 | |
| KR | 1020140063183 A | 5/2014 | |
| KR | 101488844 B1 | 2/2015 | |
| KR | 1020150072452 A | 6/2015 | |
| KR | 1020170027850 A | 3/2017 | |
| KR | 20180021268 A | 3/2018 | |
| KR | 1020020026267 A | 4/2022 | |
| WO | 9952378 | 10/1999 | |
| WO | 0113735 | 3/2001 | |
| WO | 2006028193 | 3/2006 | |
| WO | 2015075535 A1 | 5/2015 | |
| WO | 2016004949 | 1/2016 | |
| WO | 2017060215 A1 | 4/2017 | |
| WO | 2017097303 | 6/2017 | |

OTHER PUBLICATIONS

Official Action dated Nov. 1, 2023, Japanese Patent Application No. 2022-166782, with English translation (6 pgs.).
Notice of Reasons for Rejection mailing date Jul. 5, 2022; Japanese Patent Application No. 2021-537821, with English translation (8 pgs.).
Combined Search and Examination Report, dated Jun. 3, 2019 for United Kingdom Patent Application No. GB1821274.6 (5 pgs.).
International Search Report and Written Opinion of the International Searching Authority, date of mailing Apr. 7, 2020 for International Application No. PCT/EP2019/086859 (13 pgs.).
Extended European Search Report dated Jan. 16, 2024 European Patent Application No. 23195814.1 (7 pgs.).
Notice of Preliminary Rejection dated Jan. 15, 2024, South Korean Patent Application No. KR 10-2021-7023316 with English translation (16 pgs.).
First Office Action, dated Apr. 17, 2024, Chinese Patent Application 201980087008.7, with English translation (16 pgs.).
Japanese Decision of Refusal, dated May 27, 2024, Japanese Patent Application No. JP2022-166782, with English translation (6 pgs.).
Ochi kafue hikken! Kohi no hikime o rikaishite anata mo ochi barisuta ni! (A must-see for your home cafe! Understand how to grind coffee and become a barista at home!), HuBase[online], Jun. 8, 2017, pp. 1-13, [retrieved on May 20, 2024], http://lili-hanare.com/2017/06/08/coffee_mill/, with English translation (29 pgs.).
Notice of Allowance, dated Jan. 2, 2025, Korean Patent Application No. 10-2021-7023316 with English translation (10 pgs.).

(56) References Cited

OTHER PUBLICATIONS

Chinese Second Office Action dated Feb. 10, 2025, Chinese patent application 201980087008.7, with English translation (12 pgs.).

* cited by examiner

COFFEE EXTRACTION PROCESS AND COFFEE PRODUCT

CROSS REFERENCE TO RELATED APPLICATIONS

This application is a U.S. national phase application of International Application No. PCT/EP2019/086859, filed Dec. 20, 2019, which claims benefit from the United Kingdom Application 1821274.6, filed Dec. 28, 2018, which are each hereby incorporated herein by reference in their entirety.

FIELD

The present invention relates to a process for the extraction of roast and ground coffee with water, in particular, to a process which involves the processing of a coffee slurry to provide a coffee beverage product having an improved flavour and mouthfeel. The present invention further relates to a coffee product which can be obtained by the process.

BACKGROUND

The extraction of roast and ground coffee with water to obtain a high coffee-solids coffee extract is well known. Moreover, it is well known to dry such an extract with spray- or freeze-drying to obtain a soluble beverage powder. This beverage powder can then be reconstituted at the consumer's convenience with hot water to obtain a coffee beverage. It is desirable that such a home-made coffee beverage has a taste akin to coffee shop beverages.

The industrial production of soluble coffee products is associated with higher temperatures and pressures than coffee shop brewing systems. This allows a higher yield to be obtained from the beans and hence a higher profitability, but has a side-effect that the coffee can adopt undesirable processing flavour notes. A large number of different techniques are employed to avoid this, including methods of aroma capture to ensure that flavour molecules are retained from initial lower temperature extraction steps.

An example of a conventional coffee extraction process involves the following steps. Green coffee beans are roasted to a desired roasting extent and ground to a particle size of 2-3 mm. This is subject to a column extraction process having a first step at about 150° C. and a second at a higher temperature of about 185° C. Coffee extracts washed from the beans in each extraction step are combined, concentrated and dried. The process is semi-continuous with the use of multiple extraction columns.

EP0826308 discloses a process for the counter-current extraction of soluble coffee solids. Soluble coffee solids are extracted from roast and ground coffee in a first extraction stage using a primary extraction liquid at a temperature of 80° C. to 160° C. Then soluble coffee solids are extracted from the partially extracted grounds in a second extraction stage using a secondary extraction liquid at a temperature of 160° C. to 190° C., the coffee grounds having at least 25% by weight of soluble coffee solids extracted from them. The coffee grounds obtained from the second extraction stage are drained and thermally hydrolysed in a hydrolysis stage at a temperature of 160° C. to 220° C. for 1 to 15 minutes. Soluble coffee solids are extracted from the hydrolysed coffee grounds in a third extraction stage using a tertiary extraction liquid at a temperature of 170° C. to 195° C. to provide extracted coffee grounds and a hydrolysed coffee extract. A soluble coffee product is obtained containing at least 30% saccharides, comprising less than 1% furfural derivatives, less than 4% monosaccharides, less than 10% oligosaccharides and at least 19% polysaccharides, the saccharides having a weighted average molecular weight of greater than 2000 units with a polydispersity above 3.

EP0916267 discloses a process for the continuous extraction of water soluble solids from solid particles containing them, such as roast and ground coffee, for providing an extract product in one or more extraction stages. In each extraction stage, a slurry containing particles to be extracted and extract is introduced into an extraction reactor e.g. immediately above a solid-liquid separator to form an upwardly moving packed bed. Particles are scraped from the packed bed for defining an upper surface of the packed bed. An extraction liquid is introduced into the extraction reactor above the upper surface of the packed bed. A portion of the extraction liquid percolating through the packed bed for extracting water soluble substances from the particles in the packed bed is obtained to form an extract. The remaining portion of the extraction liquid entrains the particles scraped from the packed bed for providing a spent particles slurry. The spent particles slurry is removed from the extraction reactor. Extract is removed from below the packed bed and at least a portion of the extract forms the extract product. The extraction stages may be separated by one or more solubilization stages.

EP1069830 discloses a process for the recovery of aroma components from coffee. A slurry of coffee grounds in an aqueous liquid is subjected to stripping for stripping aroma components from the slurry. The stripping is carried out using gas in a substantially counter-current manner to provide an aromatised gas containing aroma components. The aroma components are then collected from the aromatised gas. The aroma components may be added to concentrated coffee extract prior to drying of the extract. The coffee powder produced has much increased and improved aroma and flavour and contains higher levels of furans and diketones.

U.S. Pat. No. 3,682,649 discloses a cold water, pressurised extraction of roasted coffee, in the form of whole beans or ground, to obtain a quality coffee extract and partially extracted coffee which can be further processed. The coffee extract can be dried to obtain a premium soluble coffee. The partially extracted coffee can be further extracted by standard percolation techniques or can be dried and used as regular roasted and ground coffee.

U.S. Pat. No. 3,652,292 discloses the manufacture of an instant coffee powder which comprises soluble coffee solids prepared by extraction as an aqueous medium, into which wet ground colloidal particles of roast or extracted roast coffee are added. The colloidal particles represent about 3 percent to 40 percent by weight of the total weight of the coffee product. The colloidal particles are stabilized against flocculation by regulation of the pH so as not to exceed a pH of 5.2 and said particles are encased in the dried soluble coffee solids to form an instant coffee product having a fresh-brewed coffee aroma flavour and turbidity.

EP1795074 relates to a method of providing a concentrated coffee extract which is rich in aroma component released when the roasted coffee beans are ground and has an amount of coffee oil controllable in accordance with the use and purpose, and a process for industrially producing the same. According to the present invention, the above object is achieved by separating an aroma component-containing distillate, a coffee oil-containing liquid, and a coffee extract from a slurry obtained by wet-grinding roasted coffee beans, and after the coffee extract is concentrated, adding back the aroma component-containing distillate and the coffee oil-containing liquid.

Since the production of liquid (i.e. aqueous) coffee extracts and dried soluble coffee products is associated with a disparity in flavour, compared to freshly made coffee beverages made fresh in a coffee-shop environment, there is a constant aim to improve the methods of production to achieve improved products. One common approach to improving the flavour of dried soluble coffee products is the addition of finely ground roasted coffee particles into a coffee extract before drying. The inclusion of such particles is typically controlled to avoid undue sediment in the beverage, but generally does have a beneficial effect on the product flavour. The presence of small particles can also contribute to the observed mouthfeel.

SUMMARY

Accordingly, it is desirable to provide an improved method for making coffee products, improved coffee products and/or to tackle at least some of the problems associated with the prior art or, at least, to provide a commercially viable alternative thereto.

According to a first aspect there is provided a method for the manufacture of a coffee-extract product, the method comprising:
(a) providing roast and ground coffee having a mean particle size of from 100 to 600 microns;
(b) mixing the roast and ground coffee with water to form a first slurry containing 15 to 30 wt % coffee solids,
(c) passing the first slurry through an aroma-separation step to recover a coffee aroma fraction and to form a dearomatised slurry;
d) passing the dearomatised slurry to a first filtration device at a temperature of from 90 to 150° C. to form a first coffee extract and a first filter cake;
(e) adding water to the first filter cake to form a reconstituted slurry having at least 12 wt % coffee solids;
(f) thermally treating the reconstituted slurry at a temperature of from 150 to 205° C.;
(g) then passing the thermally-treated reconstituted slurry to a second filtration device to form a second coffee extract and a second filter cake;
(h) combining the first and second coffee extracts to form a third coffee extract;
(i) concentrating the third coffee extract to form a fourth coffee extract having 35 to 70 wt % coffee solids;
(j) adding the coffee aroma fraction to the fourth coffee extract to form a liquid, coffee-extract product.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The present invention provides a method for the manufacture of a coffee-extract product. That is, the invention provides coffee products obtainable from a coffee extract. Examples of such products include liquid concentrates, such as are sold as bag-in-box coffee products, or soluble coffee products, such as freeze-dried or spray-dried powders or tablets. The liquid concentrates and soluble coffee products are both considered to be "instant" coffee products since they immediately form a beverage on the addition of water.

All of these different product-types are well known in the art. Such products may be supplemented by the addition of a small amount of finely ground roast and ground coffee to improve the flavour or appearance, as is well known in the art.

The present application refers to "solids". These are the matter which remains after all water has been removed. Accordingly, if you take a coffee beverage and remove the water (by evaporation) you will be left with coffee solids. These coffee solids will comprise soluble coffee solids and insoluble coffee solids. The insoluble coffee solids will include roast and ground coffee material as well as coffee oils. A further distinction is made herein for the insoluble coffee sediment fraction which is the non-oil portion of the insoluble coffee solids.

This invention utilizes a new extraction process which can fundamentally change the flavour and taste of instant coffee, while still only relying on water extraction. Key parameters driving these changes are through using a much finer grind size in combination with lower extraction and hydrolysis temperatures, but without compromising the yield of the process.

The present invention has a number of advantages over prior art methods as will become apparent from the discussion below. One advantage of the present process is that it can be conducted in a fully continuous manner. This saves cost and complexity in the processing apparatus. Another benefit is that it can be operated with lower amounts of water, which is of course environmentally desirable, but also leads to large energy savings when aiming to provide liquid concentrates or dried powders, since less water needs to be removed.

The present invention also uses a lower than conventional temperature in the initial heat treatment which encourages the recovery of more desirable coffee flavours. Since the method has a higher temperature secondary heat treatment, this ensures that the high yield is maintained.

Furthermore, the invention provides a coffee product which has an improved flavour and taste. In particular, the flavour and taste are surprisingly different from products obtained by conventional methods, such that the beverage has a thicker mouthfeel and better flavour notes.

The method comprises a number of steps. It will be apparent that a number of these steps must be conducted sequentially on a given portion of the material being processed, but it should also be appreciated that the steps can be conducted as part of a continuous process, batchwise or a combination of the two.

According to the first step (step (a)), a roast and ground coffee is provided having a mean particle size of from 100 to 600 microns, preferably 200 to 600 microns. The roast and ground coffee is obtained from coffee beans which have been roasted and ground using well established techniques in the art. The mean particle size is the D50, as measured using a Helos dry laser diffractometer under standard measurement conditions.

The grind size adopted here is much finer than that employed for conventional coffee extraction processes which typically use particle sizes of about 2 mm. The fine particle size allows the formation of a pumpable slurry, while increasing the surface area for extraction. Conversely, the energy required to grind the coffee to this size is not too great and does not result in undesirable heat-degradation of the beans during grinding.

Preferably the roast and ground coffee is ground to a mean particle size of from 200 to 400 microns, more preferably 250 to 350 microns, which is in the region of particle sizes conventionally ground for the production of expresso coffee beverages. This is particularly advantageous since, as explained below, less water needs to be added to make a slurry. Moreover, below 250 microns the filtration becomes harder and less efficient. At particle sizes below 100 microns the particles can block the filter.

In another embodiment, preferably the roast and ground coffee has a mean particle size of from 400 to 600 microns. This is particularly advantageous for making liquid coffee concentrates. This is because for liquid product it is better to have larger particles to reduce oil content in the product, since oil contributes to crema instability in liquids. The larger particle size releases less oil into the obtained extract.

According to a further step (step (b)), the roast and ground coffee is mixed with water to form a first slurry containing 15 to 30 wt % coffee solids. That is, water is added to the coffee beans in a ratio such that the coffee beans provide 15-30 wt % of the whole mixture, preferably 20 to 25 wt %. The coffee solids include insoluble coffee solids as well as soluble coffee solids, some of which will dissolve into the added water. This level of water provides a pumpable slurry. The amount of water required for a pumpable slurry depends on the size of the grind employed: a coarser grind requires more water for pumpability. With a grind size of about 250 microns, it is readily possible to use a dilution to achieve, for example, 25% solids. With a grind size of about 100 microns, it is readily possible to use a dilution to achieve, for example, 30% solids. However, at a particle size of 400 to 600 microns, it is desirable to add more water, such as to achieve 15% solids.

According to a further step (step (c)), the first slurry is passed through an aroma-separation step to recover a coffee aroma fraction and to form a dearomatised slurry. Aroma separation systems are well known in the soluble coffee production field. An exemplary treatment unit is a spinning cone column which can be operated to extract the aroma. This involves the introduction of steam into the slurry which strips aroma from the coffee which can be recovered as an aqueous aroma stream which is stored for later use. Step (c) may be conducted under vacuum.

The temperature of the slurry in the aroma-separation step can be adjusted as required, but is typically in the region of 70 to 100° C., such as 90 to 100° C., at the start of the treatment. This heat treatment (i.e. the aroma separation) is preferably conducted for from 10 seconds to 2 hours, 1 minute to 25 minutes, preferably 1 to 5 minutes. In an alternative embodiment the duration may be 15 to 25 minutes. The temperature may, of course, be affected by steam addition, if this is the aroma recovery technique employed. Aroma separation can be conducted under vacuum.

The temperature of the slurry can be elevated in advance of the aroma-separation step by heating the added water either before or after the slurry has been formed. The temperature change can be effected using heat recovered from other steps in the process, such as by using convention heat-exchangers. Preferably the water in step (b) is at a temperature of from 80 to 100° C. when it is mixed with the coffee. This is because it is cheaper to add hot water than it is to heat it with the beans or to use steam to heat the slurry. If the water is not heated before mixing with the coffee then it is added at a temperature of between 15 and 40° C. and the subsequent slurry is heated to 80 to 100° C. This option has an advantage of improved process simplicity.

At this point in the process, after step (c), the slurry comprises soluble coffee solids, insoluble coffee solids which have been dearomatised and water.

According to a further step (step (d)), the dearomatised slurry is passed to a first filtration device at a temperature of from 90 to 150° C., preferably 90 to 120° C. and more preferably 90 to 100° C., to form a first coffee extract and a first filter cake. In a preferred embodiment, dearomatised slurry is passed to a first filtration device at a temperature of from 140 to 150° C. This process therefore separates the majority of the soluble coffee solids and water from the insoluble coffee solids. The first filtration device can be one of several known filtration systems, including settling tanks, filters and centrifuges. Filters are preferred due to their capacity for efficient continuous processing and versatility in handling fine particles. It is most desired that a continuous filtration device is used. This allows efficient separation of the insoluble solids from the water with recovery rates of the soluble solids of greater than 90%.

The coffee solids in the filter cake can be subjected to washing or pressing to increase the extraction of soluble coffee solids. The first coffee extract, which is a concentrated coffee liquor, may be stored for later use in the process or added directly to a later step in a continuous version of the process.

According to a further step (step (e)), water is added to the first filter cake to form a reconstituted slurry having at least 12 wt % coffee solids. That is, water is added in an amount necessary to produce a slurry typically having slightly lower solids levels than in the first slurry formation step. Preferably the reconstituted slurry formed in step (e) has 12 to 30 wt % solids, more preferably 12 to 20 wt %. This level of solids is selected to achieve desirable pumpability. Again the reconstitution can be effected with heated water as necessary.

Preferably the water in step (e) is at a temperature of from 80 to 100° C. This is because it is cheaper to add hot water and this also helps to achieve part of the temperature required in the following step. The heat may be recovered from other steps in the process.

According to a further step (step (f)), the reconstituted slurry is thermally treated at a temperature of from 150 to 205° C., preferably from 170 to 205° C. and more preferably from 180 to 205° C. This heating is preferably conducted at an elevated pressure in order to enhance the extraction rate. A preferred pressure is from 2 to 30 Bar, such as 15 Bar. This heat treatment is preferably conducted for from 5 minutes to 2 hours, preferably 5 to 15 minutes, preferably 5 to 10 minutes. In an alternative embodiment the duration may be 15 to 25 minutes. During this step some of the insoluble coffee solids are hydrolysed into soluble solids which can then be recovered. This step may be conducted using a plug flow reactor.

At this point in the process the slurry again comprises soluble coffee solids, insoluble coffee solids and water. This can be subjected to a flash treatment where a pressure drop allows the removal of any unwanted aroma flavours.

According to a further step (step (g)), the thermally-treated reconstituted slurry is passed to a second filtration device to form a second coffee extract and a second filter cake. The filtration device may be any filtration device as discussed above. This serves to separate a coffee liquor containing dissolved soluble coffee solids from the insoluble coffee solids. The second filter cake can again be washed and/or pressed to recover additional coffee extract.

The second coffee extract generally has a lower soluble solids concentration than the first coffee extract.

The second coffee extract, which is a concentrated coffee liquor, may be stored for later use in the process.

According to a further step (step (h)), the first and second coffee extracts are combined to form a third coffee extract. The two coffee extracts are generally combined to provide the third by simple mixing.

According to a further step (step (i)), the third coffee extract is concentrated to form a fourth coffee extract having 35 to 70 wt % coffee solids, preferably 35 to 65 wt % and more preferably 40 to 50%. When adding in the aroma in the following step (j), a level of solids of from 55 to 60% after step (i) is preferred in order to allow the dilution to achieve a useful final concentration. This serves to provide a coffee extract suitable for use as a concentrate (i.e. flowable) or for use in a drying process to produce a dried product (i.e. less water to remove). Preferably step (i) is conducted in an evaporator unit.

According to a further step (step (j)), the coffee aroma fraction (from step (c)) is added to the fourth coffee extract to form a liquid, coffee-extract product. This improves the flavour of the extract without compromising the solids level. The aroma is added back after the concentration step to avoid loss of the limited amounts of the aroma from the product. The resultant coffee extract preferably has 35 to 65 wt % and preferably, 45 to 65 wt % coffee solids.

Preferably the coffee-extract product is a soluble powder. That is, the method further comprises a step (k) of drying the liquid coffee-extract product to form a soluble powder. Preferably the drying step is freeze-drying since this helps to retain the improved aroma profile of the product. Preferably the powder product has a mean particle size of from 200 to 3000 microns, more preferably 500 to 2000 microns.

Alternatively, if a liquid coffee concentrate product is desired, then the process may include a further step after step (L) after step (j) in which the extract is diluted to lower the solids levels, such that the final product has a soluble solids content of 25 to 55 wt %, preferably 25 to 35%. This is a suitable solids level for a liquid concentrate.

The coffee solids remaining after step (g) can be processed as a waste stream and may be incinerated to provide energy for the process (such as for heating water). Alternatively, the second filter cake may be subjected to a further high temperature extraction process to obtain a further coffee extract to be combined in step (h) with the first and second coffee extracts to form the third coffee extract. Suitable conditions for this further high temperature processing step are temperatures of from 190 to 215° C. This heat treatment is preferably conducted for from 5 minutes to 2 hours, preferably 15 to 25 minutes. This further step may be conducted using a further set of slurry formation and filtration steps, or using a conventional extraction technique.

In general, the claimed method involves the use of less water than a conventional extraction method. The use of high solids levels reduces energy consumption for the associated concentration steps. The process also allows for efficient recycling of heat between the different stages with the addition of heated water at different stages and heat which can be recovered from the high temperature extraction step products.

Preferably the method further comprises packaging the coffee-extract product.

Accordingly to a preferred embodiment of the method, the method comprises:
(a) providing roast and ground coffee having a mean particle size of from 200 to 600 microns;
(b) mixing the roast and ground coffee with water to form a first slurry containing 15 to 30 wt % coffee solids,
(c) passing the first slurry through an aroma-separation step to recover a coffee aroma fraction and to form a dearomatised slurry;
(d) passing the dearomatised slurry to a first filtration device at a temperature of from 90 to 100° C. to form a first coffee extract and a first filter cake;
(e) adding water to the first filter cake to form a reconstituted slurry having at least 12 wt % coffee solids;
(f) thermally treating the reconstituted slurry at a temperature of from 180 to 205° C.;
(g) then passing the thermally-treated reconstituted slurry to a second filtration device to form a second coffee extract and a second filter cake;
(h) combining the first and second coffee extracts to form a third coffee extract;
(i) concentrating the third coffee extract to form a fourth coffee extract having 35 to 60 wt % coffee solids;
(j) adding the coffee aroma fraction to the fourth coffee extract to form a liquid, coffee-extract product.

This preferred embodiment can be freely combined with all further features of the first aspect.

According to a further aspect there is provided a coffee-extract product obtainable by the method described herein.

The finished instant coffee product shows an improved flavour with less process flavours and an improved flavour closer to freshly brewed coffee. Undesired process sourness created through processing at higher temperatures is also reduced.

The present inventors have found that the above described process leads to a unique instant coffee product (i.e. liquid coffee concentrate or soluble coffee powder). In particular, the product has an improved aroma and mouthfeel compared to conventional commercially available coffee products. The inventors have sought to identify the unique properties of the product which give rise to the observed improvements in aroma and mouthfeel.

The process results in the presence of an insoluble coffee sediment fraction within the product. This fraction superficially resembles the roast and ground coffee additive often added to coffee products to improve the aroma of conventional coffee extracts. However, the insoluble coffee sediment fraction is present in the product as a direct consequence of the process and does not require an additional step of supplementing the coffee extract with roast and ground coffee. Accordingly, the product of the invention can be characterised by the presence of an insoluble coffee sediment fraction which distinguishes over commercially available coffee products which have not been supplemented with additional roast and ground coffee.

Surprisingly, the inventors have found that the insoluble coffee sediment fraction obtained as a direct consequence of the process is less likely to sediment out of the extract than a post-added roast and ground coffee extract. This is observed in the final beverage where there is markedly reduced sediment or scum deposited on the wall of a receptacle after the beverage is swirled within the receptacle.

The insoluble coffee sediment fraction obtained with the process described above further differs from the insoluble coffee sediment fraction observed for coffees with a conventional addition of a roast and ground coffee additive. This is because the fraction has undergone the coffee extraction process, being exposed to heated aqueous environments, which changes the balance of carbohydrates in the insoluble coffee material. Accordingly, the product of the invention can be characterised by a carbohydrate analysis of the insoluble coffee sediment fraction which distinguishes over commercially available coffee products which have been supplemented with additional roast and ground coffee.

In addition, the process results in a higher oil fraction in the coffee product. This is a consequence of the finer coffee particle grind size used in the method. Since a finer grind exposes more surface area of the coffee for extraction, it is understood that a greater amount of oil is released in the extraction process. Accordingly, the product of the invention can be characterised by the presence of a higher oil fraction which distinguishes over commercially available coffee products obtained by conventional extraction processes.

According to a further aspect of the invention there is provided an instant coffee composition for forming a coffee beverage,
 wherein the composition comprises at least 6 wt % of an insoluble coffee sediment fraction, the insoluble coffee sediment fraction comprising, when analysed after acid hydrolysis, 1 wt % or less arabinose.

The insoluble coffee sediment fraction is the sediment obtained using the repeated centrifugation process described herein. It represents the solid material (not oils) present in the product which are insoluble in water.

According to a further aspect of the invention there is provided an instant coffee composition for forming a coffee beverage,
 wherein the composition comprises an insoluble coffee sediment fraction, the insoluble coffee sediment fraction comprising, when analysed after acid hydrolysis, 1 wt % or less arabinose, and
 wherein the composition comprises at least 0.8 wt % coffee oils by dry weight, preferably from 1 to 5 wt % coffee oils.

According to a further aspect of the invention there is provided an instant coffee composition for forming a coffee beverage, wherein the composition comprises at least 6 wt % of an insoluble coffee sediment fraction and at least 0.8 wt % coffee oils by dry weight, preferably from 1 to 5 wt % coffee oils.

According to a further aspect of the invention there is provided an instant coffee composition for forming a coffee beverage,
 wherein the composition comprises at least 6 wt % of an insoluble coffee sediment fraction, the insoluble coffee sediment fraction comprising, when analysed after acid hydrolysis, 1 wt % or less arabinose and
 wherein the composition comprises at least 0.8 wt % coffee oils by dry weight, preferably from 1 to 5 wt % coffee oils.

According to a further aspect of the invention there is provided an instant coffee composition for forming a coffee beverage,
 wherein the composition comprises at least 6 wt % of an insoluble coffee sediment fraction and
 wherein the composition when analysed by wet laser diffraction at a 1.5 wt % concentration has a monomodal particle size distribution.

According to a further aspect of the invention there is provided an instant coffee composition for forming a coffee beverage,
 wherein the composition comprises an insoluble coffee sediment fraction comprising, when analysed after acid hydrolysis, 1 wt % or less arabinose and
 wherein the composition when analysed by wet laser diffraction at a 1.5 wt % concentration has a monomodal particle size distribution.

According to a further aspect of the invention there is provided an instant coffee composition for forming a coffee beverage,
 wherein the composition when analysed by wet laser diffraction at a 1.5 wt % concentration has a monomodal particle size distribution, and
 wherein the composition comprises at least 0.8 wt % coffee oils by dry weight, preferably from 1 to 5 wt % coffee oils.

In each of the above aspects relating to an instant coffee composition, the term "instant" encompasses both a dried powder product, such as a soluble coffee powder, and a liquid coffee extract (e.g. 30 wt % coffee solids (soluble and insoluble) in water). Preferably the composition is dried, more preferably spray- or freeze-dried, or vacuum dried. Such dried products tend to have a longer product life.

The compositions preferably comprises from 7.5 to 15 wt % of the insoluble coffee sediment fraction. This amount of the insoluble coffee sediment fraction provides a well-balanced aroma without having an unduly large amount of insoluble material which can adversely affect the mouthfeel and can cause undesirable sediment.

Preferably the insoluble coffee sediment fraction comprises, when analysed after acid hydrolysis, from 0.5 to 1 wt % arabinose.

Preferably the insoluble coffee sediment fraction comprises, when analysed after acid hydrolysis, less than 5 wt % galactose, preferably from 2 to 4 wt % galactose.

Preferably the instant coffee composition comprises at least 1 wt % coffee oils by dry weight, preferably from 1.5 to 5 wt % coffee oils. The increased levels of oil improve the mouthfeel of the product. The oil is obtained as a consequence of the process and has been found to be well distributed within the extract, helping to improve the mouthfeel without undesirable oil slicks being visible on the final beverage.

Preferably the instant coffee composition when analysed by wet laser diffraction at a 1.5 wt % concentration (solids) has unimodal particle size distribution. This distinguishes over those products where roast and ground coffee is added as a supplement to a soluble coffee powder (generally in the coffee extract before drying). Specifically, conventionally milling techniques which fracture coffee beans generally give rise to a bimodal distribution based on the fracturing of the coffee beans, with a lower peak resulting from the finest cell wall fragments. In contrast, the retained coffee particles after the method of the invention, or which are retained in a conventional extract having escaped a percolation column, have a bimodal distribution.

Preferably under the same particle measurement the instant coffee composition also has a D50 of less than 10 microns, preferably from 2.5 to 7.5 microns. This fine particle size reflects the influence on the extract obtained from the above described coffee process. Indeed, the particle size distribution observed is unusual, since the D90 is typically greater than 30 microns, reflecting a broad particle size distribution.

Preferably the composition consists of coffee. That is, preferably the coffee composition does not include any non-coffee components or additives.

The quantification and analysis of the insoluble coffee sediment fraction requires the separation of the insoluble coffee solids from the soluble coffee solids. In order to facilitate this assessment for a liquid coffee product, it is necessary to dry the product to a powder so that the same analysis can be performed.

To isolate and quantify the insoluble coffee sediment fraction (also known as sediment), 30 grams of a given coffee sample (dry powder) is added to 70 grams of boiling water and shaken for 2 minutes. The sample is then centrifuged for 15 minutes at 10,000 g. After centrifugation the supernatant is decanted off and the sediment re-dissolved with 70 grams of boiling water, shaken for 2 minutes and then centrifuged again under the same conditions as above. This washing process is repeated 3 times for a total of four centrifugation steps. The sediment from the final wash is then freeze dried and then the sediment percentage is related to the starting sample of 30 g (e.g. 1.8 g of sediment represents a 6 wt % insoluble coffee sediment fraction). Before any analysis is carried out the dried sediment sample is homogenised by simple stirring.

In view of the method for analysing the insoluble coffee sediment fraction, the fraction does not include any coffee oils which may be present, even though these would also be considered insoluble. This is because the oil will be readily separated in the centrifugation steps.

To test the carbohydrates within the isolated insoluble coffee sediment fraction a total carbohydrate analysis is carried out using high performance anion exchange-pulsed amperometric detection (HPAEC-PAD), according to ISO 11292-1995. The sample is prepared by mixing the already-isolated sediment with 50 ml of 1M HCl and then shaking the sample for 150 minutes at 95° C. Quantification of the monosaccharides are carried out by analysing external standards of the monosaccharides as usual.

To determine the particle size distribution of the instant coffee product a Particle size distribution analysis was carried out using a Malvern® Mastersizer 3000 with Hydro MV tank. 1.5 g of sample (±0.0005 g) was made up to 100 g (±0.05 g) with deionised water boiled at 100° C., stirred for 60 seconds, cooled slightly, and added dropwise into the Malvern® unit to achieve obscuration around 10%. An average of 3 readings were taken. Again, in order to facilitate this assessment for a liquid coffee product, it is necessary to dry the product to a powder so that the same analysis can be performed.

To determine the oil content, samples of the product (firstly dried if the product is a liquid coffee concentrate) were assessed using Soxtec H6. 2 g of sample was mixed with Petroleum Ether 40-60, boiled for 2 hours and then rinsed for approx. 0.5 hours. The resulting condensate is then heated to recover the solvent. The assessment of oil levels in this way is well known in the art.

In some embodiments the instant coffee compositions of the present invention may be blended with a conventional coffee obtained by known methods. For example, a product might contain 10-100%, such as 20 to 50% of the coffee described herein, blended with the balance of a conventional coffee. While this can be readily achieved for a liquid product, a soluble product might be formed from a mixed liquid extract or by dry mixture of different powder products. This may be advantageous where the mouthfeel and taste benefits of the invention are to be moderated to provide a closer to conventional beverage experience.

BRIEF DESCRIPTION OF THE FIGURE

The invention will now be described further with respect to the figures, in which.

DETAILED DESCRIPTION

Figure 1:
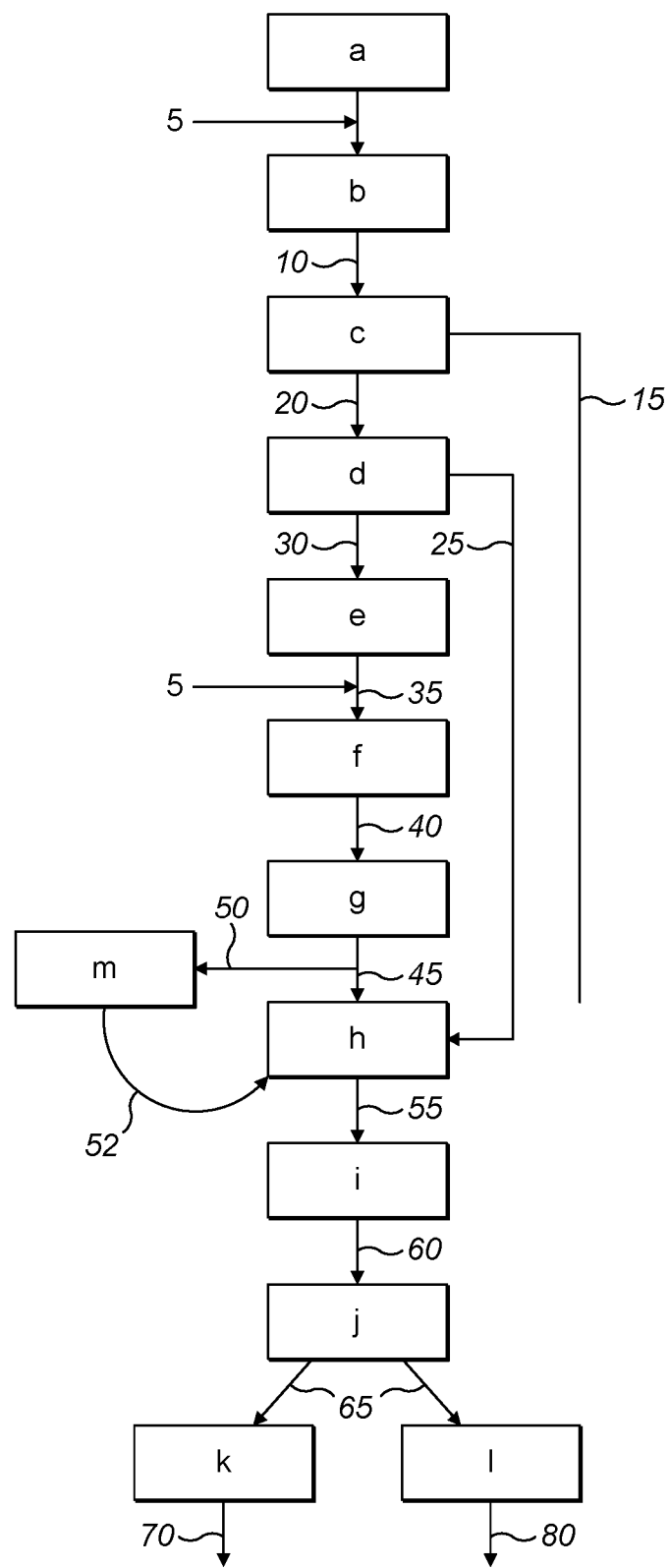
FIG. 1 shows a flow-chart of the steps of the present invention.

As shown in FIG. 1, the method for the manufacture of a coffee-extract product includes a number of steps.

In step (a) roast and ground coffee is provided having a mean particle size of from 100 to 600 microns, preferably 200 to 600 microns. Within this range, larger sizes are favoured for liquid extract products, whereas smaller sizes are favoured for dried soluble coffee products.

In step (b) the roast and ground coffee with water 5 to form a first slurry 10 containing 15 to 30 wt % coffee solids. The water 5 is added at a temperature of from 80 to 100° C., and preferably from 90 to 95° C. The solids level is determined by the particle size, since a minimum amount of water 5 is used as necessary to obtain a pumpable slurry 10. The larger the particle size, the more water 5 is required (the lower the solids) to achieve a pumpable slurry 10.

In step (c) the first slurry is passed through an aroma-separation step to recover a coffee aroma fraction 15 and to form a dearomatised slurry 20. A typical approach to this method involves the addition of steam to the pumpable slurry 10 where the vapours are treated in a spinning cone treatment unit.

In step (d) the dearomatised slurry 20 is passed to a first filtration device at a temperature of from 90 to 150° C., such as 90 to 100° C., to form a first coffee extract 25 and a first filter cake 30. The temperature is retained from the preceding step or can be further increased to increase the extraction yield. The filter cake 30 may be washed and is pressed to obtain the largest possible amount of soluble coffee solids.

In step (e) water 5 is added to the first filter cake 30 to form a reconstituted slurry 35 having at least 12 wt % coffee solids. The water 5 is preferably hot and there may be mechanical agitation to break up the first filter cake 30. The amount of water required to reconstitute a slurry tends to be higher than that required in step (b).

In step (f) the reconstituted slurry 35 is thermally treated at a temperature of from 150 to 205° C., such as 180 to 205° C. to form a thermally-treated reconstituted slurry 40. That is, it is pumped through a heat-treatment unit, such as a plug-flow reactor. Residence times in the heat treatment are typically at least 5 minutes to ensure good extraction.

In step (g) the thermally-treated reconstituted slurry 40 is passed to a second filtration device to form a second coffee extract 45 and a second filter cake 50. The second filter cake 50 may be washed and is pressed to obtain the largest possible amount of soluble coffee solids. The temperature in this step may be retained from the preceding step, or may be lowered as heat is recovered for use in step (b), such as down to a temperature of from 80 to 100° C.

The second filter cake 50 may then be burned in step M to produce heat for the process, or may be subjected to a further high temperature extraction step M to obtain a further coffee extract 52.

In step (h) the first coffee extract 25 and the second coffee extract 45 are combined to form a third coffee extract 55. Other aqueous coffee extracts may also be added in this step, such as further coffee extract 52.

In step (i) the third coffee extract 55 is concentrated to form a fourth coffee extract 60 having 35 to 70 wt % coffee solids, such as 35 to 60 wt % coffee solids.

In step (j) the coffee aroma fraction 15 is added to the fourth coffee extract 60 to form a liquid, coffee-extract product 65.

The liquid coffee extract product 65 may be treated in step K to form a dried coffee product, such as a soluble coffee powder 70. The liquid coffee extract product 65 may be diluted in step L to form a liquid coffee concentrate 80.

Figure 3:
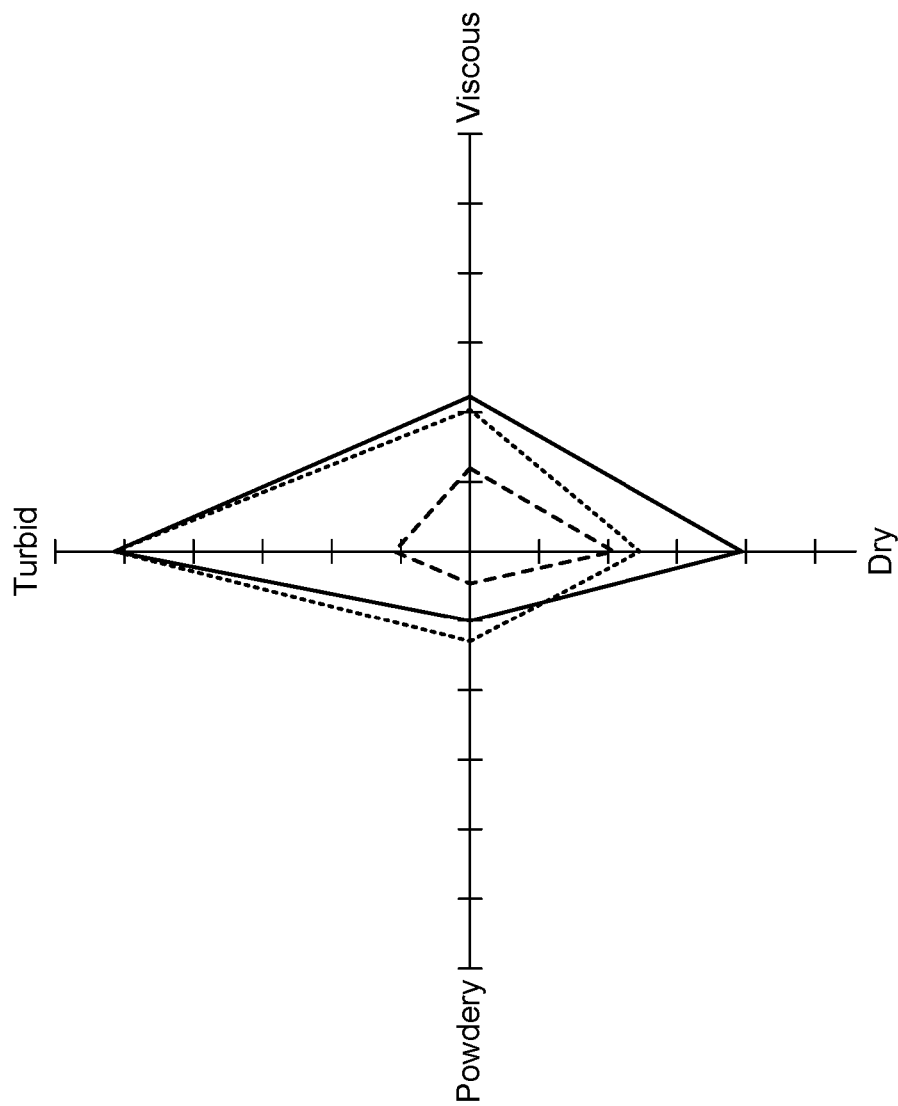
FIG. 3 shows sensory data from a trial.

In FIG. 3 the current technology is represented by the smallest quadrilateral. The other two quadrilaterals represent different Prototypes with 70% current and 30% new technology products. The axis are: positive x (Viscous); positive y (Turbid); negative x (powdery); negative y (dry).

The present invention will now be described further in relation to the following non-limiting example.

Example 1

Roast whole beans were ground to between 200 μm and 400 μm in a 3 stage roller grinder.

The roast and ground coffee was slurried with water at 20° C.-30° C. at a ratio of 25% Coffee to 75% water.

The slurry was fed forward into a heat exchanger and heated to 95° C. before moving into a spinning cone column where aroma was stripped from the slurry.

Upon exit of the spinning cone the slurry was fed forward through a heat exchanger, raising the temperature to between 120° C. and 150° C. for 2 to 5 minutes.

The slurry was then fed into a filter separating the coffee liquor from the grounds. The grounds were then subjected to 2 further washing steps at 130° C. to 150° C. to remove additional solids.

The grounds were then re-slurried at a ratio of 12% to 17% solids with fresh water. The resulting slurry was fed forward to a hydrolysis step where it was heated to between 180° C. and 205° C. (185° C.) and held for between 5 and 20 minutes.

The resulting slurry was then cooled to below 100° C. before passing through a second filtering step repeating the separation and washing of the first separation step.

The coffee extracts obtained from each filtration step were combined and concentrated. The aroma compounds stripped from the first slurry where then added to the mixture. The fully combined three components were then freeze-dried with a conventional process to obtain a soluble coffee powder.

The process recovered an incremental yield of 2% roasted coffee over current technologies with reduced water usage.

Example 2

Arabica and/or Robusta beans were roasted and ground, using a 3-stage roller grinder, to a mean particle size of 300 μm. The ground coffee was then slurried with water at 20-25° C. at a ratio of 25% coffee to 75% water.

The slurry was fed forward into a heat exchanger and heated to 70° C. before moving into a spinning cone column where aroma was stripped from the slurry.

The slurry was then fed into a filter at a temperature of 95° C. separating the coffee liquor from the grounds. The grounds were then subjected to 2 further washing steps to remove additional solids.

The grounds were then re-slurried at a ratio of 12% to 17% solids with fresh water. The resulting slurry was fed forward to a plug-flow reactor (hydrolysis step) where it was heated to 170° C. and held for 5-10 minutes.

The resulting slurry was then cooled to below 100° C. before passing through a second filtering step repeating the separation and washing of the first separation step.

The coffee extracts obtained from each filtration step were combined and concentrated. The aroma compounds stripped from the first slurry where then added to the mixture. The fully combined three components were then freeze-dried with a conventional process to obtain a soluble coffee powder.

The product of this example was found to have more body/mouthfeel than products produced using current technology.

Example 3

A coffee slurry was prepared as described in Example 1.

The slurry was fed forward into a heat exchanger and heated to 95° C. before moving into a spinning cone column where aroma was stripped from the slurry.

Upon exit of the spinning cone the slurry was fed forward through a heat exchanger, raising the temperature to between 145-150° C. for 4 to 5 minutes.

The slurry was then fed into a filter separating the coffee liquor from the grounds. The grounds were then subjected to 2 further washing steps at 140° C. to remove additional solids.

The slurry was then fed into a filter separating the coffee liquor from the grounds. The grounds were then re-slurried at a ratio of 12% to 17% solids with fresh water. The resulting slurry was fed forward to a plug-flow reactor (hydrolysis step) where it was heated to 200° C. and held for 7-10 minutes.

The resulting slurry was then cooled to below 100° C. before passing through a second filtering step repeating the separation and washing of the first separation step.

The coffee extracts obtained from each filtration step were combined and concentrated. The aroma compounds stripped from the first slurry where then added to the mixture. The fully combined three components were then freeze-dried with a conventional process to obtain a soluble coffee powder.

The product of this example was found to have more body/mouthfeel than products produced using current technology.

Example 4

Arabica and/or Robusta beans were roasted and ground, using a 3-stage roller grinder, to a mean particle size of 400 μm. The ground coffee was then slurried with water at 20-25° C. at a ratio of 15% coffee to 85% water.

The remainder of the process was conducted as per example 1.

The resulting product has lower levels of oil than the product of example 1.

Example 5

Samples obtained by the method described herein were assessed in comparison to a range of commercially available soluble coffee products. As can be seen from the comprehensive testing, the products obtained by the process are new and can be readily distinguished from products obtained from conventional processes.

| | | Oil Content | | |
|---|---|---|---|---|
| | Sample | Type | Bean blend* | Fat Content |
| 1 | Alta Rica | Pure Instant | Arabica | 0.3 |

-continued

Oil Content

| | Sample | Type | Bean blend* | Fat Content |
|---|---|---|---|---|
| 2 | Nescafe Gold Blend | Whole Bean Instant | Arabica/ Robusta | 0.4 |
| 3 | Kenco Really Rich | Pure Instant | Arabica/ Robusta | 0.2 |
| 4 | Milicano | Whole bean Instant | Arabica/ Robusta | 0.7 |
| 5 | Percol | Pure Instant | Robusta | 0 |
| 6 | Kenco Really Rich | Pure Instant | Arabica/ Robusta | 0.2 |
| 7 | Prototype Colombian | Product of invention | Arabica | 1.8 |
| 8 | Prototype Central | Product of invention | Arabica | 1.8 |
| 9 | Prototype Robusta | Product of invention | Robusta | 0.4 |
| 10 | Prototype Brazil | Product of invention | Arabica | 3.9 |

*bean identity for competitor products is based on an educated guess

Examples 7, 8, 9 and 10 have been produced in accordance with the method described herein. Examples 1-6 are commercially available products, of which 2 and 4 are products supplemented with added roast and ground coffee additives (designated "whole bean instant" in the table).

It should generally be appreciated that levels of oil in Robusta beans are lower than in Arabica beans. This is reflected with the generally lower levels of oil in products comprising Robusta beans, include inventive example 9. Sample 10 is a dark Brazil known for high oil levels.

As can be seen, there are low levels of oil in the pure instant coffees, i.e. samples 1, 3, 5 and 6, which have not been supplemented with roast and ground coffee additives. The oil levels are slightly higher in samples 2 and 4 due to the oil content of the roast and ground coffee additives, with sample 2 containing approximately 5% roast and ground coffee and Sample 4 containing more roast and ground coffee.

Samples 7, 8 and 10 contain high levels of oil due to the fine grind of roasted coffee in the new process which releases more oil into the extract.

As can be seen, no conventional soluble coffee products contain significant levels of oil. Indeed, it is speculated that the levels of oil observed for some of these products is added afterwards to the surface of the dried powder to improve its aroma.

The only prior art products which contain high oil levels are a consequence of the addition of roast and ground coffee additives in the product. In contrast, the method described herein achieves high levels of oil, even for Robusta bean products.

Sediment Levels

Sediment levels were determined by taking 30 grams of a given coffee sample added to 70 grams of boiling water and shaken for 2 minutes. The sample is then centrifuged for 15 minutes at 10,000 g. After centrifugation the supernatant is decanted off and the sediment re-dissolved with 70 grams of boiling water, shaken for 2 minutes and then centrifuged again under the same conditions as above. This washing process is repeated 3 times for a total of four centrifugation steps. The sediment from the final wash is then freeze dried and then the sediment percentage is related to the starting sample of 30 g (e.g. 1.8 g of sediment represents a 6 wt % insoluble coffee sediment fraction).

| | Sample | Sediment (wt %) |
|---|---|---|
| 1 | l'Or Intense | 5.2 |
| 2 | Kenco Rich | 4.7 |
| 3 | Carte Noir | 3.8 |
| 4 | Kenco Milicano Americano | 11.5 |
| 5 | Nescafé Gold | 4.4 |
| 6 | Nescafé Azera Americano | 9.3 |
| 7 | Inventive sample Robusta | 11.9 |
| 8 | Inventive sample Colombia Arabica | 7.8 |
| 9 | Inventive sample Centrals Arabica | 9.2 |

Examples 7, 8 and 9 have been produced in accordance with the method described herein. Examples 1-6 are commercially available products, of which 4, 5 and 6 are products supplemented with added roast and ground coffee additives.

As can be seen, all commercially available instant coffee products have some level of insoluble coffee sediment fraction. This is expected to be small fragments of coffee cell walls which pass through the extraction system into the coffee extracts. The levels of the insoluble coffee sediment fraction typically increase for those products supplemented with added roast and ground coffee additives.

As can be seen, the products produced according to the method described herein all have significantly higher levels of insoluble coffee sediment fraction than instant coffee products which have not been supplemented with added roast and ground coffee additives.

Particle Size Distribution

| | sample description | D [3,2] μm | D [4,3] μm | Dx (10) μm | Dx (50) μm | Dx (90) μm |
|---|---|---|---|---|---|---|
| 1 | l'Or Intense | 1.84 | 15.7 | 0.79 | 2.85 | 8.49 |
| 2 | Kenco Rich | 2.74 | 42.3 | 1.35 | 3.69 | 11.2 |
| 3 | Carte Noir | 1.96 | 4.73 | 0.897 | 2.79 | 8.63 |
| 4 | Kenco Milicano Americano | 4.32 | 13.1 | 1.6 | 11.7 | 27.3 |
| 5 | Nescafé Gold | 3.4 | 42.5 | 1.1 | 20.1 | 102 |
| 6 | Nescafé Azera Americano | 5.91 | 136 | 2.16 | 31.1 | 197 |
| 7 | Inventive sample Robusta | 3.35 | 8.22 | 1.56 | 4.97 | 14.6 |
| 8 | Inventive sample Colombia Arabica | 2.58 | 33.9 | 1.02 | 4.68 | 37.2 |
| 9 | Inventive sample Centrals Arabica | 2.67 | 33.4 | 1.03 | 5.32 | 34.5 |

Examples 7, 8 and 9 have been produced in accordance with the method described herein. Examples 1-6 are commercially available products, of which 4, 5 and 6 are products supplemented with added roast and ground coffee additives.

The sediment quantification method with multiple centrifugation steps allows for a large amount of very fine particles to be recovered.

Particle size distribution has been measured with the Malvem® 3000 after making a 1.5% hot brew of the dried product, for example, 3 g of dried product in 200 ml of hot water.

3 classes of sediment can be distinguished:
Class 1 L'Or Intense, Kenco Rich and Carte Noir:
    Unimodal distribution D10: <1.5 and D90: <15 μm
    Relative low amount of sediment <5.5% wt
    The very small particle size (such as low D90) perhaps reflects the way in which these particles have escaped from the extraction column into the extract, or mannans which have sedimented in the evaporator.

Class 2: Kenco Milicano, Nescafe Gold and Azera clearly differs from class 1 and 3 Bi-modal distribution (2 peaks) peak 1 between 1 and 10 µm and peak 2 between 10 and 100 µm.

Class 3: Inventive Samples

Unimodal distribution but broader distribution than class 1 D10: >1.0 and D90: >15 µm and relative higher amount of sediment such as >7.5% wt.

Carbohydrate Analysis

The analysis is of mono-saccharides after acid hydrolysis.

| | sample description | Arabinose | Galactose | Glucose | mannose | Total |
|---|---|---|---|---|---|---|
| 1 | I'Or Intense | 0.71 | 3.45 | 0.33 | 61.2 | 65.7 |
| 2 | Kenco Rich | 0.48 | 2.43 | 0.31 | 50.9 | 54.1 |
| 3 | Carte Noir | 0.61 | 3.01 | 0.43 | 69.0 | 73.1 |
| 4 | Kenco Milicano Americano | 1.99 | 8.88 | 0.4 | 36.1 | 47.4 |
| 5 | Nescafé Gold | 1.34 | 6.36 | 0.37 | 50.7 | 58.8 |
| 6 | Nescafé Azera Americano | 1.42 | 7.06 | 0.46 | 60.8 | 69.7 |
| 7 | Inventive sample Robusta | 0.77 | 2.47 | 0.28 | 42.4 | 45.9 |
| 8 | Inventive sample Colombia Arabica | 0.74 | 3.08 | 0.41 | 54.5 | 58.7 |
| 9 | Inventive sample Centrals Arabica | 0.76 | 3.51 | 0.45 | 55.2 | 59.9 |

Examples 7, 8 and 9 have been produced in accordance with the method described herein. Examples 1-6 are commercially available products, of which 4, 5 and 6 are products supplemented with added roast and ground coffee additives.

As can be seen, the insoluble coffee sediment fraction of the products of the invention has a level of Arabinose broadly similar to that of a soluble coffee product which has not been supplemented with roast and ground coffee. Typically it also has a lower level of galactose than a soluble coffee product which has been supplemented with roast and ground coffee Without wishing to be bound by theory, it is considered that the high levels of arabinose in the supplemented products is a consequence of the presence of the unextracted coffee material. In contrast, for the inventive products, the levels are lower reflecting the fact that the arabinose has already been extracted into the soluble coffee fraction by the process of the invention.

Sensory Testing 2 prototypes of the product of the invention were combined with product from current technology in a ratio of 30 (POI):70 (current product). These were then tested in a set with an additional sample of 100% current technology product. The 3 samples were given to a panel of sensory experts who were then asked to pair the products according to similarities/dissimilarities to the third.

The results indicate that even at levels of only 30% in a blend with current products the prototype is considered more viscous/dry and powdery-all attributes contributing to mouthfeel/body. The levels correlate directly with the tribology data. More oil means more lubrication which means more mouthfeel/body. The effects are shown in FIG. 3.

Collapse Temperature

Crystalline products have a well-defined "eutectic" freezing/melting point, this point is called its collapse temperature. When freeze-drying a concentrated coffee extract, the extract is heated up from an initial frozen temperature of about −50° C. under a vacuum. This allows the water content to sublime away. The rate of heating depends on the extract and there is a collapse temperature above which the product will have melt-back and be compromised. The temperature and pressure can then be raised on subsequent cycles until evidence of collapse or melt-back is seen, indicating that the product was too warm. Surprisingly the inventors found that the collapse temperature for several samples of the inventive product were higher than that for their standard coffee products.

Rheological Behaviour of Samples

| | |
|---|---|
| 1 | Alta Rica |
| 2 | Nescafe Gold Blend |
| 3 | Kenco Really Rich |
| 4 | Milicano |
| 5 | Percol |
| 6 | Kenco Really Rich |
| 7 | NGC Colombian |
| 8 | NGC Central |
| 9 | NGC Robusta |
| 10 | NGC Brazil |

Samples were prepared with 10 g of coffee dissolved in 40 g of water at 85° C. Full dissolution was achieved with 2 minutes stirring with a 25 mm stirring bar at 150 rpm.

These samples were tested with simple shear sweeps between shear rates of 0.01-1000 s$^{-1}$ using a Discovery HR-2 Rheometer, sample volume 8 ml, with the circulation bath set to minus 4° C. The samples were studied at temperatures of 20 and 65° C. and at concentrations of 1.5 and 20 wt %.

The data has then been fitted to the Quemada model which develops insights into fluid rheology based on the theory of internal structural units (SUs) suspensions. Within concentrated systems the single particles and small flocs may form increasingly larger groups the size of which will be dependent on the shear rates applied.

Therefore since viscosity (η) is a function of structure (η=f(s)). And the structure is dependent on the levels of shear applied (as increased shear rates will merely act to disperse the macro and meso-structures of the flocs into the individual sub-units), the viscosity can be expressed in terms of the packing fraction/compactness since the more compact the SU's the higher the packing and therefore the more structure (viscosity) there will be.

This is because the compactness of the SU's will contribute to the level of structure;

$$\eta_\infty = \eta_F\left(1 - \frac{\phi}{\phi_\infty}\right)^{-2}$$

$$\eta_0 = \eta_F\left(1 - \frac{\phi}{\phi_0}\right)^{-2}$$

Where η is viscosity and φ is the measure of compactness.

Figure 2:
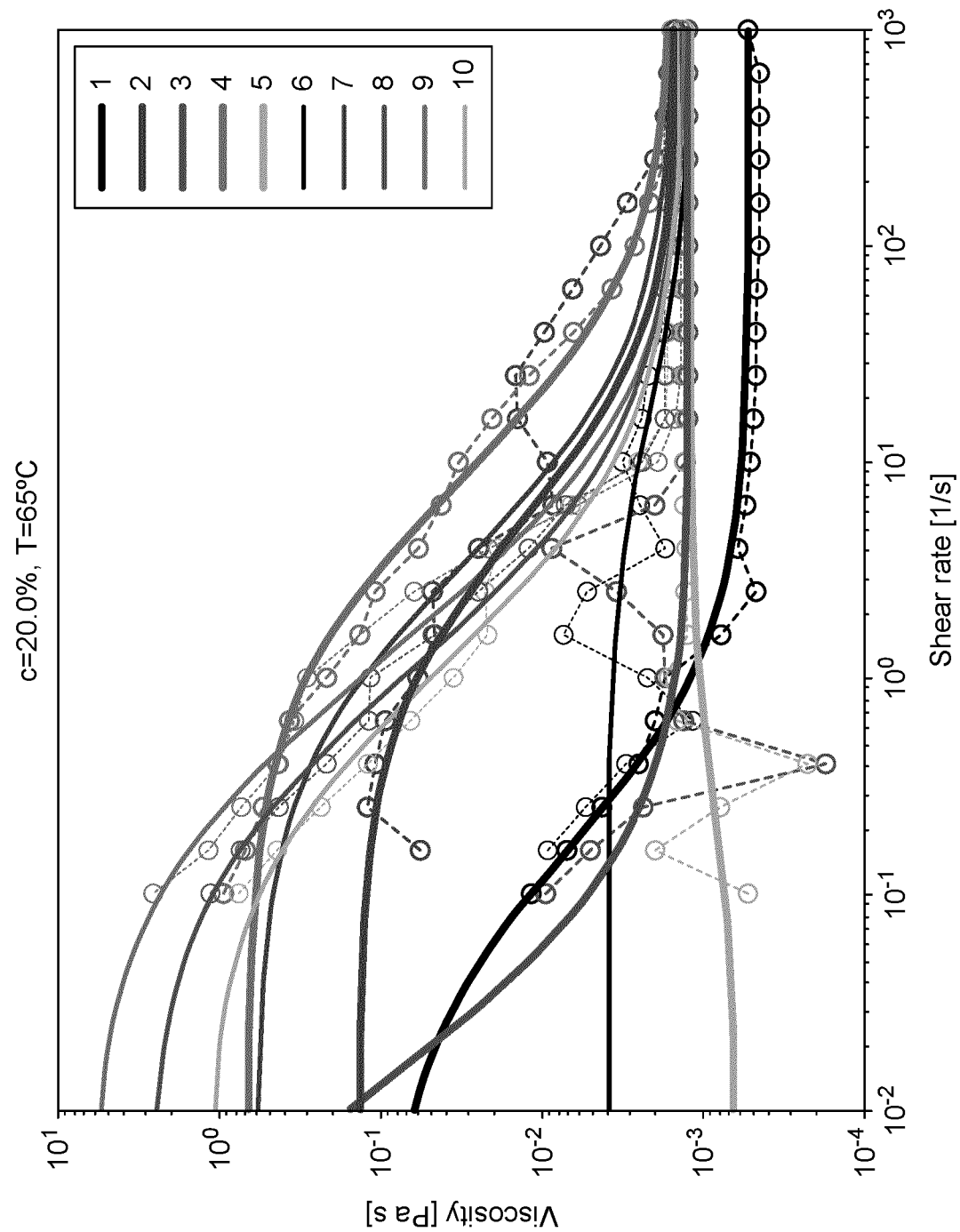
FIG. 2 shows a plot of the viscosity of various samples at different shear rates.

FIG. 2 shows the results from this measurement. In this plot the important information is provided by the intercepts of the plots with the y-axis, representing the initial structure of the test samples. The lines, from top to bottom, are samples 9, 8, 10, 4, 7, 3, 2, 1, 6, 5.

We can conclude that at 20 wt % (i.e. concentrated samples) at 65° C. (close to temperature of consumption) that samples 4 (Milicano) and 7-10 have significantly higher no. This means that from a microstructural perspective at lower shear rates (1 s$^{-1}$) which are representative of those during mastication and are reflective of mouthfeel, these samples have more structure relative to the other samples.

This implies that at these lower shear rates the compactness of their structural units is higher i.e. better packing of the structural units.

Tribology of the samples was also observed. "Tribology is the science and engineering of interacting surfaces in relative motion. It includes the study and application of the principles of friction, lubrication and wear." Therefore the parameter to pay attention to is the $\mu_{max}$ which represents the maximum friction observed for each sample. Since lubrication is indicative of mouthfeel here and a higher $\mu_{max}$ indicates lower rates of lubrication which should translate to lower mouthfeel.

It was observed that at 65° C. (consumption temp) samples 7, 8 and 10 have significantly lower values for $\mu_{max}$ indicating lower friction and hence higher mouthfeel. The exception is sample 9 (Robusta blend) with lower oil content.

Unless otherwise stated, all percentages herein are by weight.

Although preferred embodiments of the invention have been described herein in detail, it will be understood by those skilled in the art that variations may be made thereto without departing from the scope of the invention or of the appended claims.

The invention claimed is:

1. A method for the manufacture of a coffee-extract product, the method comprising:
   (a) providing fresh roast and ground coffee having a mean particle size of from 100 to 600 microns;
   (b) mixing the fresh roast and ground coffee with fresh water to form a first slurry containing 15 to 30 wt % coffee solids,
   (c) passing the first slurry through an aroma-separation step to recover a coffee aroma fraction and to form a dearomatised slurry;
   (d) passing the dearomatised slurry to a first filtration device at a temperature of from 90 to 150° C. to form a first coffee extract and a first filter cake;
   (e) adding water to the first filter cake to form a reconstituted slurry having at least 12 wt % coffee solids;
   (f) thermally treating the reconstituted slurry at a temperature of from 150 to 205° C.;
   (g) then passing the thermally-treated reconstituted slurry to a second filtration device to form a second coffee extract and a second filter cake;
   (h) combining the first and second coffee extracts to form a third coffee extract;
   (i) concentrating the third coffee extract to form a fourth coffee extract having 35 to 70 wt % coffee solids;
   (j) adding the coffee aroma fraction to the fourth coffee extract to form a liquid, coffee-extract product, wherein the coffee-extract product, without an additional step of adding to the coffee-extract product any roast and ground coffee or coffee oil, comprises at least 6 wt % of an insoluble coffee sediment fraction and at least 0.8 wt % coffee oils by dry weight.

2. The method according to claim 1, wherein the roast and ground coffee has a mean particle size of from 250 to 400 microns.

3. The method according to claim 1, wherein the coffee-extract product is a soluble powder, the method further comprising:
   (k) drying the liquid coffee-extract product to form a soluble powder.

4. The method according to claim 1, wherein the liquid, coffee-extract product has 40 to 50 wt % coffee solids.

5. The method according to claim 1, wherein the water in step (b) and/or step (e) is at a temperature of from 80 to 100° C.

6. The method according to claim 1, wherein the reconstituted slurry formed in step (e) has 12 to 30 wt % solids.

7. The method according to claim 1, wherein the second filter cake is subjected to a further high temperature extraction process to obtain a further coffee extract to be combined in step (h) with the first and second coffee extracts to form the third coffee extract.

8. The method according to claim 1, wherein step (f) is conducted in a plug-flow reactor.

9. The method according to claim 1, wherein step (i) is conducted in an evaporator unit.

10. The method according to claim 1, wherein step (c) is conducted under vacuum.

11. The method according to claim 1, wherein the method further comprises packaging the coffee-extract product.

12. The method according to claim 1, wherein the method is a continuous process.

13. A coffee-extract product obtainable by the method of any of claim 1.

14. The method according to claim 1, wherein the reconstituted slurry formed in step (e) has a lower amount of coffee solids than the first slurry formed in step (b).

15. The method according to claim 14, wherein the first slurry formed in step (b) contains 20-30 wt % coffee solids, and the reconstituted slurry formed in step (e) contains 12-20 wt % coffee solids.

16. The method according to claim 1, wherein the insoluble coffee sediment fraction of the product comprises, when analyzed after acid hydrolysis, 1 wt % or less arabinose.

17. The method according to claim 1, wherein the product, when analysed by wet laser diffraction at a 1.5 wt % concentration has a D50 of less than 10 microns.

* * * * *